(12) United States Patent
Martin et al.

(10) Patent No.: US 11,129,201 B2
(45) Date of Patent: Sep. 21, 2021

(54) TELECOMMUNICATIONS APPARATUS USING A FIRST RANDOM ACCESS PROCEDURE AND A SECOND RANDOM ACCESS PROCEDURE

(71) Applicants: Sony Corporation, Tokyo (JP); Sony Mobile Communications Inc., Tokyo (JP)

(72) Inventors: Brian Alexander Martin, Basingstoke (GB); Yuxin Wei, Basingstoke (GB); Anders Berggren, Lund (SE); Vivek Sharma, Basingstoke (GB); Hideji Wakabayashi, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/476,108

(22) PCT Filed: Jan. 5, 2018

(86) PCT No.: PCT/EP2018/050239
§ 371 (c)(1),
(2) Date: Jul. 5, 2019

(87) PCT Pub. No.: WO2018/127549
PCT Pub. Date: Jul. 12, 2018

(65) Prior Publication Data
US 2019/0357267 A1      Nov. 21, 2019

(30) Foreign Application Priority Data

Jan. 6, 2017   (EP) .................................... 17150585

(51) Int. Cl.
*H04W 74/08*      (2009.01)
*H04W 28/08*      (2009.01)

(52) U.S. Cl.
CPC ....... *H04W 74/0833* (2013.01); *H04W 28/08* (2013.01)

(58) Field of Classification Search
None
See application file for complete search history.

(56) References Cited

U.S. PATENT DOCUMENTS

2016/0174237 A1* 6/2016 Zhao ..................... H04W 72/10
370/329
2016/0309518 A1* 10/2016 Patel ................. H04W 74/0833
2019/0357266 A1* 11/2019 Ren ....................... H04W 80/02

FOREIGN PATENT DOCUMENTS

EP        2 205 037 A1    7/2010

OTHER PUBLICATIONS

InterDigital Communications, "Random Access Procedure", 3GPP TSG-RAN WG1 #87 R1-1612311, Reno, USA, Nov. 14-18, 2016, 4 pages (Year: 2016).*

(Continued)

*Primary Examiner* — Anh Ngoc M Nguyen
(74) *Attorney, Agent, or Firm* — Xsensus LLP

(57) ABSTRACT

A method of transmitting data in a telecommunications system comprising a terminal transmitting a first random access request message to the base station in accordance with the first random access procedure for transmitting the data to the base station, the first random access request message comprising at least part of the data and a first preamble; and upon determination that the use of the first random access procedure has been unsuccessful, the terminal transmitting a second random access request message to the base station in accordance with the second random (Continued)

access procedure for transmitting the data to the base station, the second random access request message comprising a second preamble.

15 Claims, 6 Drawing Sheets

(56) References Cited

OTHER PUBLICATIONS

Office Action dated Jul. 21, 2020 in European Patent Application No. 18 700 067.4, 5 pages.
International Search Report and Written Opinion dated Mar. 21, 2018 for PCT/EP2018/050239 filed on Jan. 3, 2018, 10 pages.
Nokia et al., "Random access principles for new radio", 3GPP TSG-RAN WG1 No. 87 R1-1612299, Reno USA, Nov. 14-18, 2016, 4 pages.
Interdigital Communications, "Random Access Procedure", 3GPP TSG-RAN WG1 No. 87 R1-1612311, Reno USA, Nov. 14-18, 2016, 4 pages.
Holma et al., "LTE for UMTS OFDMA and SC-FDMA Based Radio Access", Wiley 2009, System Architecture Based on 3GPP SAE, 11 pages.
3GPP, "3rd Generation Partnership Project; Technical Specification Group Radio Access Network; Evolved Universal Terrestrial Radio Access (E-UTRA); Medium Access Control (MAC) protocol specification", Release 14, 3GPP TS 36.321 V14.0.0, Sep. 2016, pp. 1-96.
Qualcomm Incorporated, "Control channel for slot format indicator", 3GPP TSG-RAN WG1 No. 87 R1-1612062, Nov. 14-18, 2016, pp. 1-2.
Nokia et al., "Considerations on NR RACH procedures", 3GPP TSG-RAN WG2 Meeting No. 96 R2-168013, Reno, USA, Nov. 14-18, 2016, 5 pages.
Huawei et al., "UL data transmission in RRC_INACTIVE", 3GPP TSG-RAN WG2 No. 96 R2-168544, Reno, USA, Nov. 14-18, 2016, pp. 1-8.
Ericsson, "Baseline solution for small data transmission in RRC_INACTIVE", 3GPP TSG-RAN WG2 No. 96 Tdoc R2-168713, Reno, USA, Nov. 14-18, 2016, pp. 1-7.
NTT DOCOMO, "New SID Proposal: Study on New Radio Access Technology", 3GPP TSG RAN Meeting No. 71 RP-160671, Göteborg, Sweden, Mar. 7-10, 2016, 8 pages.

* cited by examiner

[S701] the terminal transmits a first RA request message to the base station and in accordance with a two-step RA procedure for transmitting the data to the base station, the first RA request message comprising at least part of the data and being based on a first preamble

[S702] upon determination that the use of the two-step RA procedure has been unsuccessful, the terminal transmits a second RA request message to the base station and in accordance with a four step RA procedure for transmitting the data to the base station, the second RA request message being based on a second preamble.

FIG. 7

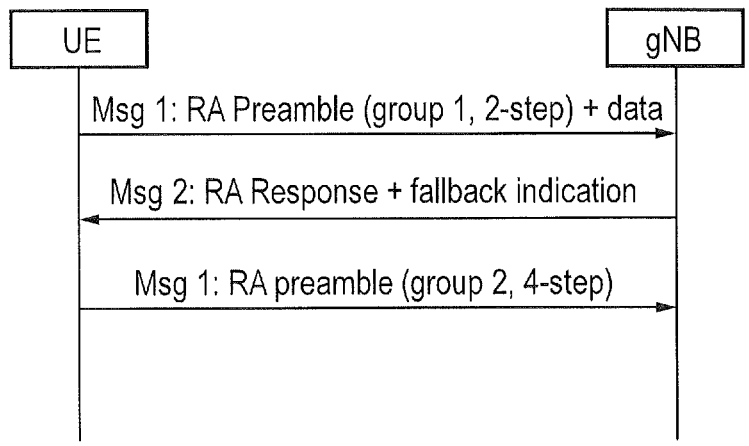

FIG. 8

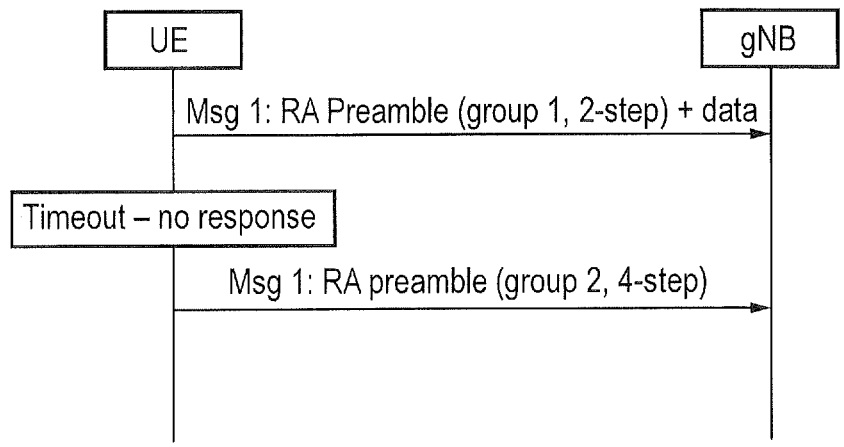

FIG. 9

TELECOMMUNICATIONS APPARATUS USING A FIRST RANDOM ACCESS PROCEDURE AND A SECOND RANDOM ACCESS PROCEDURE

CROSS-REFERENCE TO RELATED APPLICATIONS

The present application is based on PCT filing PCT/EP2018/050239, filed Jan. 5, 2018, which claims priority to EP 17150585.2, filed Jan. 6, 2017, the entire contents of each are incorporated herein by reference.

BACKGROUND

Field

The present disclosure relates to wireless telecommunications apparatuses and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example, it is expected that future wireless communications networks will efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance. A single device type might also be associated with different traffic profiles depending on the applications it is running. For example, different consideration may apply for efficiently supporting data exchange with a smartphone when it is running a video streaming application (high downlink data) as compared to when it is running an Internet browsing application (sporadic uplink and downlink data).

The new Radio Access Technology (RAT) for the next generation of mobile networks is expected to operate in a large range of frequencies, from hundreds of MHz to 100 GHz and it is expected to cover a broad range of use case, such as Enhanced Mobile Broadband (eMBB), Massive Machine Type Communications (mMTC), Ultra Reliable & Low Latency Communications (URLLC).

Amongst some of the changes proposed with the New Radio (NR, also referred to as 5G), the terminal states are expected to include one or more further states beyond the conventional active and inactive states. For example, in RAN2 #94, the introduction of a new state has been discussed wherein the terminal is an "inactive"-like state and wherein the terminal will be able to start data transfer with a relatively low delay. Accordingly discussions are ongoing regarding the transmission of data when the terminal is in an inactive or inactive-like state (where traditionally the terminal is not able to transmit data unless the state is changed to "active". For example, in some examples, the terminal may not be allowed to transfer data until it has left the "inactive" state.

In RAN2 #95, data transmission while the terminal is in inactive state and without transitioning to a connected state has be mentioned for future study.

In RAN2 #95bis, two approaches have been identified wherein in the first approach the terminal can transmit data together with initial RRC connection request message (for transitioning to a connected state). Accordingly data transfer can start before the terminal is confirmed in a "connected" state. In the second approach, a "new state" has been discussed wherein the terminal would be operable to transmit data in this new state.

In RAN2 #96, discussions were initiated to discuss uplink data transmission in inactive state. A first discussion aimed at capturing details of a solution for sending UL data without RRC signalling in inactive state and without UE initiating transition to connected. It was mentioned that the focus should be on the RAN2 aspects and that the solution should be as independent as possible of the Phy layer mechanism that is used. Further details were provided in R2-168544 ("UL data transmission in RRC_INACTIVE"). A second discussion aimed at capturing details of a solution for sending UL data with RRC signalling in inactive state with or without transition to connected. Further details were provided in R2-168713 ("Baseline solution for small data transmission in RRC_INACTIVE").

While the use of two-step RACH procedures has been mentioned as a potential option for sending data in an "inactive" state, the corresponding solution suffers from some notable drawbacks such that there is a desire for alternative options for transmitting data in an inactive state.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 7 schematically represents an example method for transmitting uplink data;

FIG. 8 schematically represents yet another message flow in an example of a random access procedure;

FIG. 9 schematically represents a further message flow in an example of a random access procedure.

DETAILED DESCRIPTION OF EXAMPLE EMBODIMENTS

Figure 1:
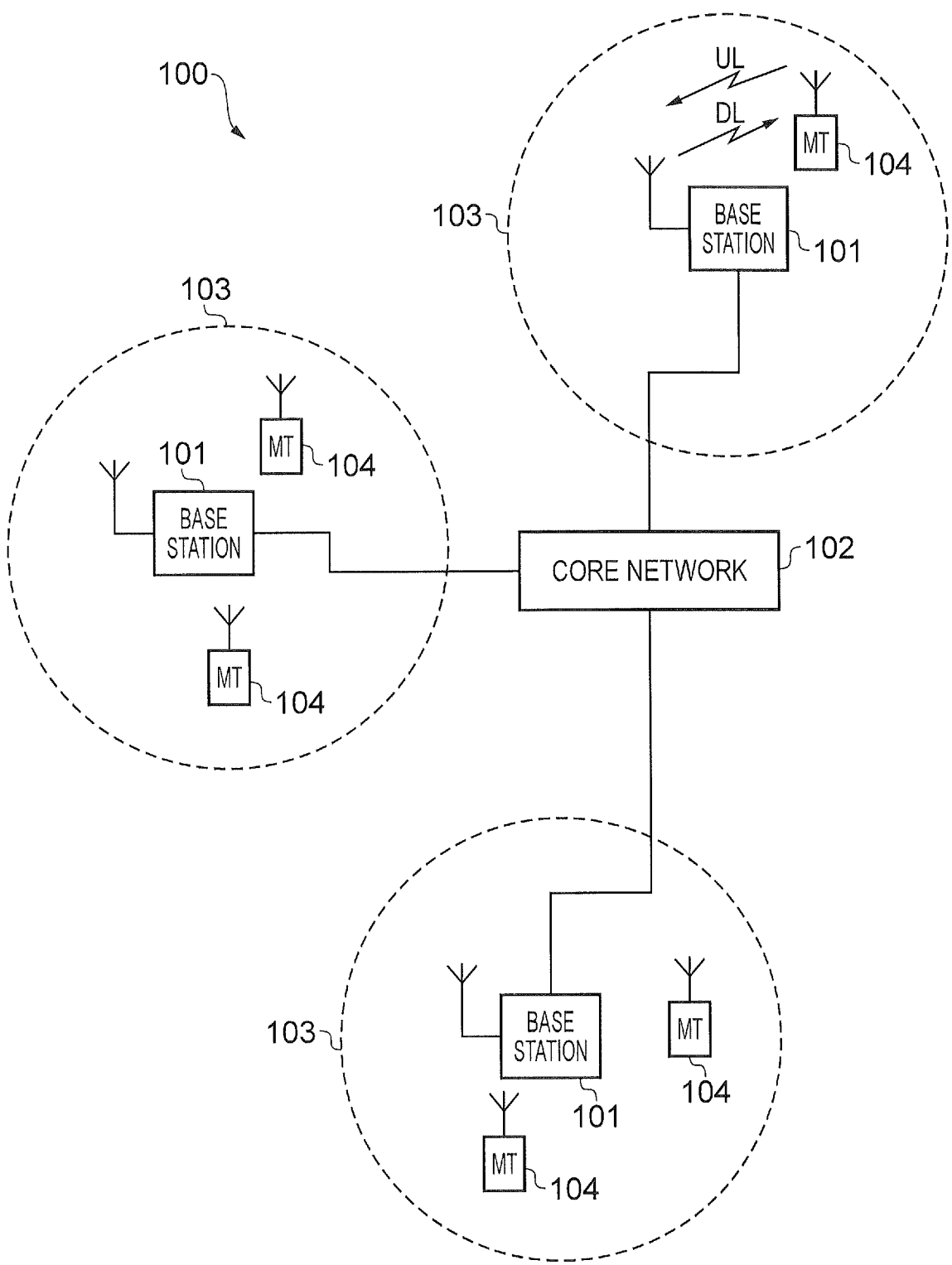
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles but which may also support other radio access technologies and which may implement embodiments of the disclosure as described herein. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards and previously proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations, nodeBs, e-nodeBs, eNB, g-nodeBs, gNB and so forth.

Figure 2:
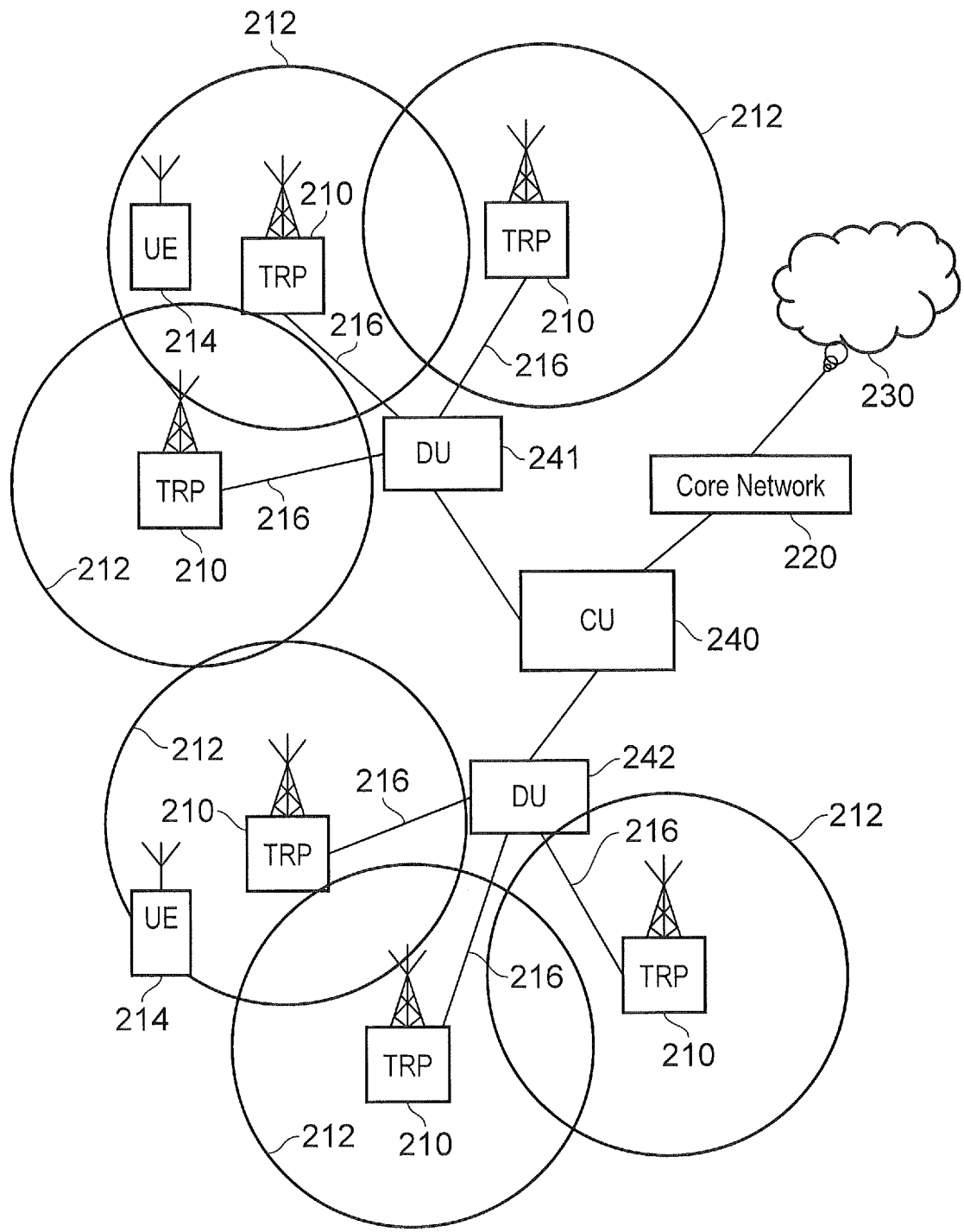
FIG. 2 is a schematic block diagram illustrating an example of a mobile telecommunication system with architectural components corresponding to that of an enhanced New Radio (NR) or 5G network.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 210 are connected to distributed control units (DUs) 241, 242 by a connection interface represented as a line 216. Each of the TRPs 210 is arranged to transmit and receive signals via a wireless access interface within a radio frequency bandwidth available to the wireless communications network. Thus within a range for performing radio communications via the wireless access interface, each of the TRPs 210, forms a cell of the wireless communications network as represented by a dashed line 212. As such wireless communications devices 214 which are within a radio communications range provided by the cells 210 can transmit and receive signals to and from the TRPs 210 via the wireless access interface. Each of the distributed control units 241, 242 are connected to a central unit (CU) 240 via an interface. The central unit 240 is then connected to the a core network 220 which may contain all other functions required to transmit data for communicating to and from the wireless communications devices and the core network 220 may be connected to other networks 230.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB of an LTE network. Similarly the communications devices 214 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

In LTE, the frame structure for the transmissions is fixed, thereby fixing the number of subframes/slots that are used for the downlink (or uplink), the locations of the Reference Signals (RS) and duration (in time) of a transmission. In NR, a flexible frame/subframe structure is expected to cater for the diverse applications (see for example the eMBB and URLLC mentioned above). Some OFDM symbols in a slot/subframe may be blank or contain only reference symbols (RS). The duration of a transmission can also be variable: the transmission can occupy multiple mini-slots, where several mini-slots are aggregated. A mini-slot is a structure in the time domain that occupies fewer resources than a slot. For example, a mini-slot can occupy one OFDM symbol or 2 OFDM symbols, and so on. Given such slot flexibility, it is proposed in [3] that a layer 1 broadcast control channel (L1-BCCH) is used to communicate the slot structure to multiple UEs at the beginning of the slot. Examples of elements of the slot structure that can be signalled include which OFDM symbols are used in the downlink or uplink, whether the slot contains blank durations, and so forth. While some of the details of this L1-BCCH channel are still under discussion, it is expected that this channel will be transmitted in 5G networks.

Figure 3:
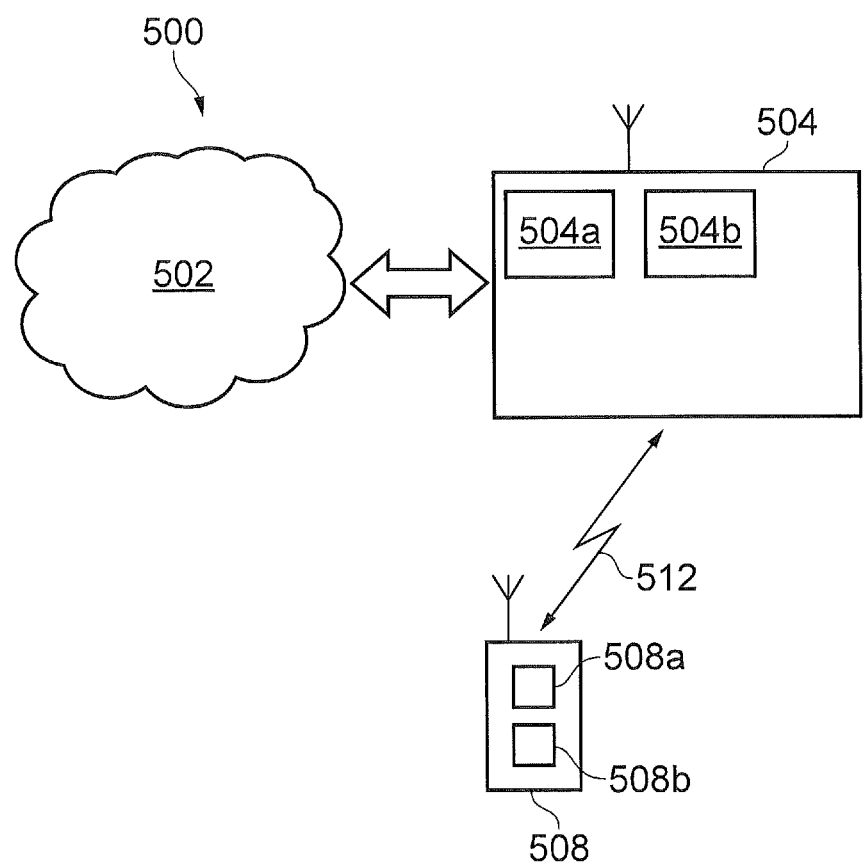
FIG. 3 schematically represents some aspects of a wireless telecommunications network configured to operate in accordance with certain embodiments of the present disclosure.

FIG. 3 schematically shows some further details of a telecommunications system 500 according to an embodiment of the present disclosure. The telecommunications system 500 in this example is based broadly around an LTE-type architecture and the telecommunications system may also support other radio access technologies, either using the same hardware as represented in FIG. 3 with appropriately configured functionality or separate hardware configured to operate in association with the hardware represented in FIG. 3. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. In this example, only one base station 504 and one terminal device 508 are represented in FIG. 3. However, it will of course be appreciated that in practice the radio network part will typically comprise a plurality of base stations serving a larger number of terminal devices across various communication cells, as well as potentially including transceiver stations supporting radio communications with terminal devices on cells operating in accordance with other radio access technologies, such as UTRAN, GERAN, WLAN or a 5G new RAT. However, only a single base station and terminal device are shown in FIG. 3 in the interests of simplicity.

The terminal device 508 is arranged to communicate data to and from the base station (transceiver station) 504. The base station is in turn communicatively connected to a serving gateway, S-GW, (not shown) in the core network part which is arranged to perform routing and management of mobile communications services to the terminal device in the telecommunications system 500 via the base station 504. In order to maintain mobility management and connectivity, the core network part 502 also includes a mobility management entity, MME, (not shown) which manages the enhanced packet service, EPS, connections with the terminal device 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 3 may be conventional apart from where modified to provide functionality in accordance with embodiments of the present disclosure as discussed herein. It will be appreciated embodiments of the invention may in general be implemented in wireless communications systems operating in accordance with different radio access technologies, for example, who one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 508 is adapted to support operations in accordance with embodiments of the present disclosure when communicating with the base station 504 as discussed further herein. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508a are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 3 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 3 for simplicity, the processor circuitry 504b may comprise scheduling circuitry, that is to say the processor circuitry 504b may be configured/programmed to provide the scheduling function for the base station 504.

While the present disclosure is generally presented in the context of NR, the skilled person will appreciate that the teachings provided herein are also applicable in different mobile environments, such as in an 4G (e.g. LTE) or 3G (e.g. UMTS, HDPA) network or in a mixed network.

Figure 10:
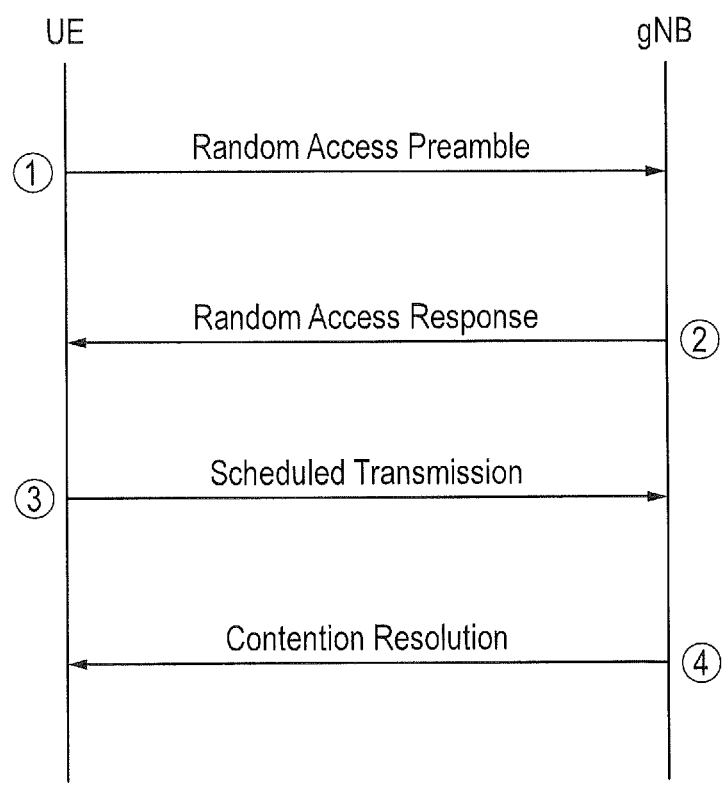
FIG. 10 schematically represents an additional message flow in an example of a random access procedure.

Some of the discussions regarding the transmission of uplink data have involved implementations using 2-step or 4-step RACH procedures. Conventional RACH procedures are based on a four message exchange which is represented in FIG. 10. In particular, the terminal first sends a message comprising a random access preamble. The base station can respond to the terminal with a grant so that the terminal can later send the uplink data it is intending to send. Accordingly in this four step procedure, the first message does not include the uplink user data and this data is only sent at a later stage.

Figure 6:
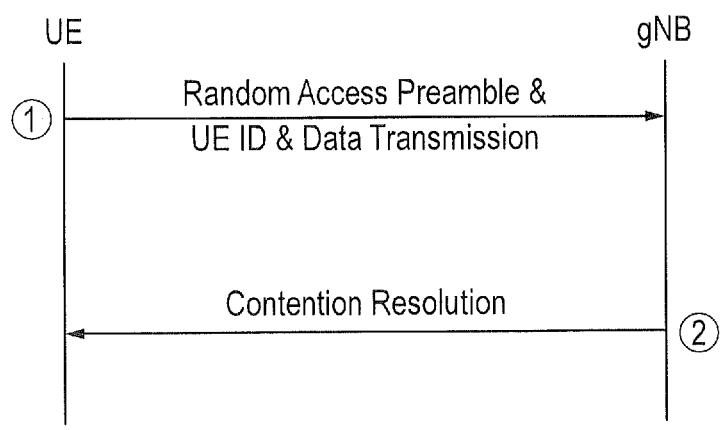
FIG. 6 schematically represents a further message flow in an example of a random access procedure.

Two step RACH procedures have also been discussed wherein, in this case, the first message comprises not only a preamble but also uplink user data to be transmitted by the terminal. An example of a two-step procedure is illustrated in FIG. 6. The first message may also include additional information such as a UE identifier. In response to this message, the base station can respond (sometimes using contention resolution) and thereby confirm receipt of the first message and of the data included in the first message. While such a RACH procedure can be used to transmit data, it will appreciate that if the size of data to be transmitted is large or that in cases of congestion, it may not provide an efficient way of transmitting the uplink data.

It is also noteworthy that while the present disclosure has been generally described in the context of a two-step and a four-step procedure, as the skilled person will appreciate the same teachings apply to other types of procedures comprising more than two or four message, respectively. As discussed above, with the first type of procedure a terminal can send data with a preamble in a first message of the procedure whereas in the second type of procedure a terminal can only send data once an uplink grant has been received (e.g. in response to the first message). In some variations, the procedures may include one or more additional messages, and the principles of the present disclosure would apply nonetheless.

Figure 4:
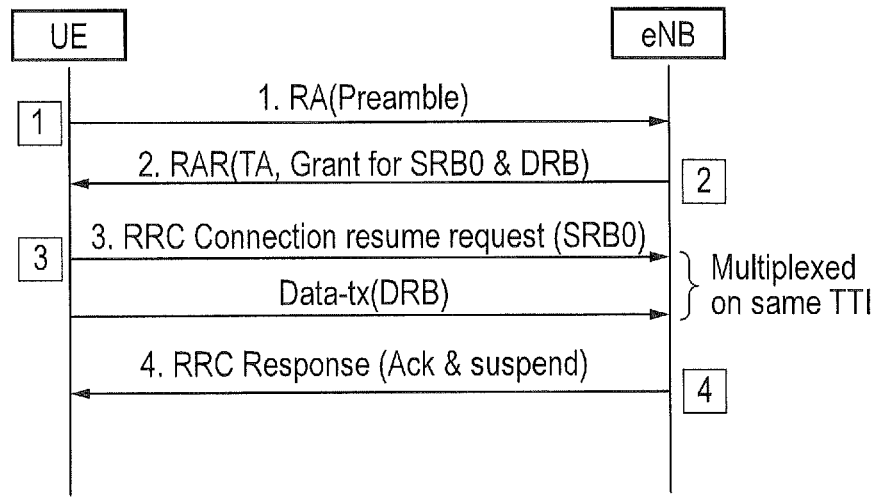
FIG. 4 schematically represents a message flow in an example of a random access procedure.

FIG. 4 for example illustrates an example of a modified four-step random access procedure wherein data can be sent with the third message of the four-steps of a RACH procedure and the procedure can be terminated with the fourth message that can also serve as an acknowledgment of the data transmission in the third message.

Figure 5:
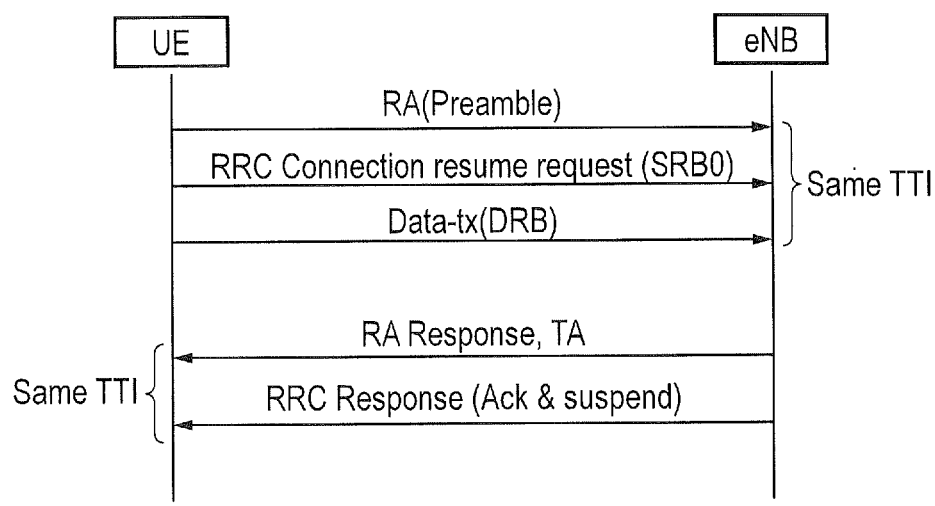
FIG. 5 schematically represents another message flow in an example of a random access procedure.

FIG. 5 illustrates a further example where the preamble is transmitted along with an RRC connection resume request and with data. This example provides a modified two step procedure wherein additional messages are being sent. The network can then respond to the first group of messages thereby completing the data transmission.

However, random access procedures have not been designed for data transmissions such that they are associated with an increased risk of collision for the first message as different terminals can selected the same preamble which would cause collisions. As a result, a two-step procedure where the data is sent with the preamble, before any contention resolution can take place could be associated with a higher risk that the data transmission would be compromised. This differs in four-step (or four-step like) random access procedure where the uplink data is only sent once uplink resources have been allocated Limitations of the arrangement of FIG. 6 are discussed at least in part in R2-168013 "Considerations on NR RACH procedures". This document notes that a fallback from a two-step procedure to a four-step procedure could be supported if the network detects that multiple terminals are attempting to transmit the data part in the same preamble. This document notes in particular the following:

"It should be noted the 2-step and 4-step approaches could be supported in parallel in the NW utilizing also the same preamble resources. As discussed above, the UL data resource in the 2-step approach could be associated with one or multiple PRACH preambles—for instance, the NW may not be able to reserve as many dedicated UL data resources as there is PRACH preambles available. In fact, with the latter approach the 2-step procedure can be backed up with the 4-step procedure if gNB can determine multiple separate preamble transmissions that mapped to the same data resource and consequently the data could not be decoded. In principle, this can be applied also in case a single preamble maps to a certain UL data resource (if the data decoding failed at the gNB), however, if multiple UEs picked the same preamble/data resource, the Msg3 would also collide.

With this case, in addition to the Contention Resolution message, the UE could listen to a possible RAR for the transmitted PRACH preamble index. Alternatively, the UE always listens to RAR message (with both 2- and 4-step approaches) which in case of 2-step approach could comprise of either Contention Resolution message or Msg3 UL grant allocation.

Observation #2: 2-step RACH procedure can fall back to 4-step procedure if gNB can determine multiple UEs transmitted within the same UL data resource or the data transmission decoding failed."

It is hereby indicated that FIGS. 4 and 5 are provided for reference and originate from R2-168713 and that FIGS. 6 and 10 are also provided for reference and originate from R2-168013.

Accordingly, the network can respond to the random access message by either using a contention resolution message In case of no collision and data is successfully received or by providing a grant to the terminal in case a collision is detected or the data is not successfully received so that it can then use the granted resources for a third message in accordance with the four-step procedure, thereby automatically switching to a four-step procedure.

However, this arrangement relies on the ability of a network to distinguish between different terminals which might be using the same data resources so that it can then provide different uplink grants for the different UEs. It also relies on the assumption that a random access response (message 2) is successfully received which is not necessarily the case in cases of congestion, especially in cases of RACH congestion and/or in cases where the base station's load is high.

The skilled reader is also directed to LTE 36.321, section 5.1 "Random Access procedure" which can provide useful information for understanding the current random access procedures and their limitations.

In accordance with the present invention there is provided an arrangement where a terminal that attempts to transmit uplink data using a two-step random access procedure can be told by the network (base station) that it should instead use a four-step random access procedure or can automatically detect that the two-step procedure has not been successful and then switch to a four-step random access procedure, thereby reducing the risk of congestion and increasing the reliability of the uplink transmissions.

FIG. 7 schematically represents an example method in accordance with the present disclosure wherein at step S701, the terminal transmits a first random access "RA" request message to the base station in accordance with a two-step RA procedure for transmitting the data to the base station. Accordingly, the first RA request message comprises at least part of the data is based on a first preamble.

If it is then determined that the use of the two-step RA procedure has been unsuccessful (S702), the terminal can then transmit a second RA request message to the base station, this time in accordance with the four-step RA procedure for transmitting the data to the base station, the second RA request message being based on a second preamble.

It would generally be expected that the terminal would detect that the two-step procedure has not been successful either when it receives an indicator from the base station that the terminal should stop attempting to use the two-step procedure and use a four-step procedure instead. This fall-back indicator can sometimes be provided by the back-off or by any other suitable indicator.

An example flowchart is provided in FIG. 8 wherein in this first example, the base station sends an explicit command that the terminal should re-attempt (or retransmit) a preamble—essentially restarting the random access procedure—using a four-step procedure rather than a two-step procedure. In the first message, the message is based on a first preamble and comprises at least part of the data, in accordance with the principles of a two-step random access procedure as discussed above. In other words, the terminal attempts to perform a two-step RACH procedure. It is expected that in most cases, the network will broadcast the conditions under which terminals shall use two-step instead of four-step procedure. Examples could be uplink data transmissions below a certain threshold data amount (as bigger transmissions may be better suited to conventional transmissions) and/or particular types of service. Additionally, grouping the preambles based on the type of procedure may provide a simplified implementation for both the terminal and base station, although in other examples one or more preambles may be used for both two- and four-step procedures. By grouping the preamble, preambles for a two-step procedure would be selected from a group that is different from the group for the four-step procedure (meaning that there is no overlap between the groups). Assuming that in the present example they are grouped, the terminal will select a preamble corresponding to the 2-step procedure and transmit the data in the corresponding resources.

In response to this message and upon detection of congestion (e.g. due to preamble collisions), the base station sends a fall-back indicator to the terminal instructing the terminal to change from a two-step operation to a four-step operation. In practice the base station may detect one or more conditions for determining whether to use the two-step procedure or to instruct the terminal to use the four-step procedure. For example, the network may fail to decode the data part of the message (which may indicate a low radio link quality such that more robust conventional transmissions may be considered preferable), it might detect congestion on the 2-step RACH resources with for example a number of preamble collision, or any other suitable collision that would mean that a four-step procedure is expected to be more appropriate. In this case the base station may respond with a random access response which indicates the UE should "backoff" (backoff indicator, or BI, is a parameter indicated in the LTE RA9R that can be re-used here) or more generally that it should fall-back to the four-step procedure or four-step like procedure (fall-back indicator). The indicator may indicate a waiting time for instructing the terminal to wait (for the indicated time) before retransmitting a random access request message. Such a delaying parameter may be beneficial in cases of RACH congestion. Once the terminal receives the indicator, the base station may explicitly indicate whether the terminal should retransmit the 2-step preamble, or start using the 4-step procedure (e.g. by selecting a preamble from a different group of preambles if appropriate). Alternative or additionally, an implicit rule may be defined that, if the terminal receives such an indicator, it will then always start again using the four-step procedure.

Accordingly, the terminal can then send a (new) first random access preamble, this time using a four-step procedure. Accordingly, this message uses a preamble and does not comprise any uplink user data.

While the examples above use an indicator for the terminal to determine that it should abort the two-step RACH procedure and switch to a four-step RACH procedure instead. However the present disclosure is not limited to this example and in some cases the terminal independently detect that it should use a four-step procedure. If for example the terminal has not received any response to the original message within a time window started by the transmission of the first message, it may automatically decide to switch to a four-step procedure. In some examples, the terminal may wait for N attempts that have not led to a response from the base station, with N=1 or N≥2, before deciding to use a four-step procedure. Accordingly, the terminal can independently detect a situation which may indicate congestion at least on the RACH such that the conventional four-step procedure can then be assumed to be preferable.

An example is illustrated in FIG. 9 that provides another example flowchart in accordance with the present disclosure. The first message is sent as in accordance with a two-step procedure and the discussion of the first message of FIG. 8 applies equally to this message such that it will not be repeated again, in the interest of conciseness. In this case, the terminal does not receive a reply to the first message. As discussed above, the terminal may make a number N of attempts, with N≥1, before it determines that the response has not been received—for example if the terminal did not receive any (timely) response to the N messages. In some cases, the RAR may not be received by the terminal (e.g. due to poor downlink channel conditions) or the base station may not be able to detect either of or both of the preamble and the message part for the first message (e.g. due to poor uplink channel conditions). In a conventional configuration, the terminal would be expected to attempt to re-transmit the same message up to the maximum number of allowed attempts. In contrast, with the present disclosure, the terminal can identify this as a condition for the terminal to automatically switch to a four-step procedure.

In some cases, two terminals may attempt to use the same preamble at the same time for sending data at the same time. In this case, and if the base station is configured to transmit a fall-back indicator and determines that such an indicator would be appropriate in this case, the base station can respond to one or both of the step-1 messages from the two terminals with a fall-back indicator. In a case where the base station responds to one of the terminal only, the other terminal may be able to receive the indicator (if for example it is monitoring the resources for responding to this preamble) and may accordingly also decide to use the second type of random access procedure Accordingly, with the present disclosure, while a two-step or two-step like procedure (where data can be sent with a preamble) can be used—if appropriate—with a view to provide means for transmitting uplink data quickly, in an inactive state and if the network is experiencing congestion, the terminal can be efficiently switched to a four-step or four-step like procedure (where data is not sent with the preamble and data is then generally only sent when an uplink resources allocation has been received) early. The number of unnecessary transmissions can thereby be reduced compared to a conventional case where the terminal would carry on with the two step procedure for a number of attempts that would bring any additional success and compared to one of the proposed arrangements where the switch to a four-step procedure can be cumbersome and is likely to require the unsuccessful transmissions of additional data before the uplink data can actually be transmitted.

Some examples of the present disclosure are discussed in the numbered clauses below.

Clause 1. A method of transmitting data in a telecommunications system comprising a terminal and a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the method comprising:

the terminal transmitting a first random access request message to the base station in accordance with the first random access procedure for transmitting the data to the base station, the first random access request message comprising at least part of the data and a first preamble; and upon determination that the use of the first random access procedure has been unsuccessful, the terminal transmitting a second random access request message to the base station in accordance with the second random access procedure for transmitting the data to the base station, the second random access request message comprising a second preamble.

Clause 2. The method of clause 1 wherein the first preamble is selected from a first group of preambles and wherein the second preamble is selected from a second group of preambles different from the first group of preambles.

Clause 3. The method of clause 1 or 2 wherein the determination that the use of the first random access procedure has been unsuccessful is based on at least one of:

a random access response message comprising an indicator, the indicator directing the terminal to use the second random access procedure; and the terminal failing to receiving a response to the first random access request message within a time window.

Clause 4. The method of any of clauses 1 to 3 further comprising the base station determining that the network is experiencing a high level of load; and upon determining that the network is experiencing a high level of load, responding to the first random access request message with a random access response message comprising an indicator, the indicator directing the terminal to use the second random access procedure.

Clause 5. The method of any of clauses 1 to 4 further comprising the base station determining that the at least part of the data in the first random access request message could not be decoded and upon determining that the at least part of the data could not be decoded, responding to the first random access request message with a random access response message comprising an indicator, the indicator directing the terminal to use the second random access procedure.

Clause 6. The method of any of clauses 3 to 5 wherein the indicator comprises waiting time information and wherein the method further comprises, upon receipt of the indicator, the terminal waiting a certain time based before transmitting the second random access request message, the waiting time being derived from the waiting time information.

Clause 7. The method of any of clauses 1 to 6 further comprising the terminal determining to send the first random access request message in accordance with the first random access procedure when the size of the data is below a threshold and the terminal determining to use the second random access procedure for transmitting the data when the size of the data is above the threshold.

Clause 8. The method of any of clauses 1 to 7 comprising the terminal determining that the use of the first random access procedure has been unsuccessful when the number of unsuccessful transmission of random access messages to the base station in accordance with the first random access procedure for transmitting the data to the base station has reached a predetermined number of attempts of one or more.

Clause 9. A telecommunications system transmitting data, the system comprising a terminal and a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the system being configured to:

Transmit, from the terminal, a first random access request message to the base station in accordance with the first random access procedure for transmitting the data to the base station, the first random access request message comprising at least part of the data and a first preamble; and transmit from the terminal, upon determination that the use of the first random access procedure has been unsuccessful, a second random access request message to the base station in accordance with the second random access procedure for transmitting the data to the base station, the second random access request message comprising a second preamble.

Clause 10. The system of clause 9 wherein the first preamble is selected from a first group of preambles and wherein the second preamble is selected from a second group of preambles different from the first group of preambles.

Clause 11. The system of clause 9 or 10 wherein the determination that the use of the first random access procedure has been unsuccessful is based on at least one of:

a random access response message comprising an indicator, the indicator directing the terminal to use the second random access procedure; and the terminal failing to receiving a response to the first random access request message within a time window.

Clause 12. The system of any of clauses 9 to 11 further configured to determine, using the base station, that the network is experiencing a high level of load; and respond, upon determining that the network is experiencing a high level of load, to the first random access request message with a random access response message comprising an indicator, the indicator directing the terminal to use the second random access procedure.

Clause 13. The system of any of clauses 9 to 12 further configured to determine, using the base station, that the at least part of the data in the first random access request message could not be decoded and respond, upon determining that the at least part of the data could not be decoded, to the first random access request message with a random access response message comprising an indicator, the indicator directing the terminal to use the second random access procedure.

Clause 14. The system of clause 12 to 13 wherein the indicator comprises waiting time information and wherein the terminal of the system is configured to wait, upon receipt of the indicator, a certain time based before transmitting the second random access request message, the waiting time being derived from the waiting time information.

Clause 15. The system of any of clauses 9 to 14 wherein the terminal of the system is configured to determine to send the first random access request message in accordance with the first random access procedure when the size of the data is below a threshold and to determine to use the second random access procedure for transmitting the data when the size of the data is above the threshold.

Clause 16. The system of any of clauses 9 to 15 comprising the terminal of the system is configured to determine that the use of the first random access procedure has been unsuccessful when the number of unsuccessful transmission of random access messages to the base station in accordance with the first random access procedure for transmitting the data to the base station has reached a predetermined number of attempts of one or more.

Clause 17. A telecommunications system transmitting data, the system comprising a terminal and a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the system being configured to implement the method of any of clauses 1 to 8

Clause 18. A method of operating a terminal for transmitting data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the method comprising:

the terminal transmitting a first random access request message to the base station and in accordance with the first random access procedure for transmitting the data to the base station, the first random access request message comprising at least part of the data and being based on a first preamble; and upon determination that the use of the first random access procedure has been unsuccessful, the terminal transmitting a second random access request message to the base station and in accordance with the second random access procedure for transmitting the data to the base station, the second random access request message being based on a second preamble.

Clause 19. The method of clause 18 wherein the first preamble is selected from a first group of preambles and wherein the second preamble is selected from a second group of preambles different from the first group of preambles.

Clause 20. The method of clause 18 or 19 wherein the determination that the use of the first random access procedure has been unsuccessful is based on at least one of:

the terminal receiving a random access response message comprising an indicator, the indicator directing the terminal to use the second random access procedure and the random access response message being transmitted in response to the first random access request message; and the terminal failing to receive a response to the first random access request message within a time window.

Clause 21. The method of clause 20 wherein the indicator comprises waiting time information and wherein the method further comprises, upon receipt of the indicator, the terminal waiting a certain time based before transmitting the second random access request message, the waiting time being derived from the waiting time information.

Clause 22. The method of any of clauses 18 to 21 further comprising the terminal determining to send the first random access request message in accordance with the first random access procedure when the size of the data is below a threshold and the terminal determining to use the second random access procedure for transmitting the data when the size of the data is above the threshold.

Clause 23. The method of any of clauses 18 to 22 wherein the first random access request message comprises at least part of the data.

Clause 24. The method of any of clauses 18 to 23 comprising the terminal determining that the use of the first random access procedure has been unsuccessful when the number of unsuccessful transmission of random access messages to the base station in accordance with the first random access procedure for transmitting the data to the base station has reached a predetermined number of attempts of one or more.

Clause 25. A terminal for transmitting data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the terminal being configured to:

transmit a first random access request message to the base station and in accordance with the first random access procedure for transmitting the data to the base station, the first random access request message comprising at least part of the data and being based on a first preamble; and transmit, upon determination that the use of the first random access procedure has been unsuccessful, a second random access request message to the base station and in accordance with the second random access procedure for transmitting the data to the base station, the second random access request message being based on a second preamble.

Clause 26. The terminal of clause 25 wherein the first preamble is selected from a first group of preambles and wherein the second preamble is selected from a second group of preambles different from the first group of preambles.

Clause 27. The terminal of clause 25 or 26 wherein the determination that the use of the first random access procedure has been unsuccessful is based on at least one of:

the terminal receiving a random access response message comprising an indicator, the indicator directing the terminal to use the second random access procedure and the random access response message being transmitted in response to the first random access request message; and the terminal failing to receive a response to the first random access request message within a time window.

Clause 28. The terminal of clause 27 wherein
the indicator comprises waiting time information and wherein the terminal is further configured to, upon receipt of the indicator, wait a certain time based before transmitting the second random access request message, the waiting time being derived from the waiting time information.

Clause 29. The terminal of any of clauses 25 to 28 further comprising the terminal being further configured to determine to send the first random access request message in accordance with the first random access procedure when the size of the data is below a threshold and to determine to use the second random access procedure for transmitting the data when the size of the data is above the threshold.

Clause 30. The terminal of any of clauses 25 to 29 wherein the first random access request message comprises at least part of the data.

Clause 31. The terminal of any of clauses 25 to 30 comprising the terminal being configured to determine that the use of the first random access procedure has been unsuccessful when the number of unsuccessful transmission of random access messages to the base station in accordance with the first random access procedure for transmitting the data to the base station has reached a predetermined number of attempts of one or more.

Clause 32. A terminal for transmitting data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the terminal being configured to implement the method of any of clauses 18 to 24.

Clause 33. Circuitry for a terminal for transmitting data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, wherein the circuitry comprises a controller element and a transceiver element configured to operate together to:

transmit a first random access request message to the base station and in accordance with the first random access procedure for transmitting the data to the base station, the first random access request message comprising at least part of the data and being based on a first preamble; and transmit, upon determination that the use of the first random access procedure has been unsuccessful, a second random access request message to the base station and in accordance with the second random access procedure for transmitting the data to the base station, the second random access request message being based on a second preamble.

Clause 34. Circuitry for a terminal for transmitting data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, wherein the circuitry comprises a controller element and a transceiver element configured to operate together to implement the method of any of clauses 18 to 24.

Clause 35. A method of operating a base station for receiving data in a telecommunications system comprising a terminal, the terminal being operable to use a first random access procedure and to use a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the method comprising:

the base station receiving a first random access request message from a terminal in accordance with the first random access procedure for transmitting the data to the base station, the first random access request message comprising at least part of the data and being based on a first preamble; and upon determination that the terminal should use the second random access procedure, the base station instructing the terminal to transmit a second random access request message in accordance with the second random access procedure for transmitting the data to the base station, the second random access request message being based on a second preamble.

Clause 36. The method of clause 35 wherein the first preamble is selected from a first group of preambles and wherein and the second preamble is selected from a second group of preambles different from the first group of preambles.

Clause 37. The method of clause 35 or 36 wherein the determination is based on at least one of:
the base station determining that the network is experiencing a high level of congestion, and
the base station determining that the at least part of the data in the first random access request message could not be decoded.

Clause 38. The method of any of clauses 35 to 37 wherein instructing the terminal comprises responding to the first random access request message with a random access response message comprising an indicator, the indicator directing the terminal to use the second random access procedure.

Clause 39. A base station for receiving data in a telecommunications system comprising a terminal, the terminal being operable to use a first random access procedure and to use a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the base station being configured to:

receive a first random access request message from a terminal in accordance with the first random access procedure for transmitting the data to the base station, the first random access request message comprising at least part of the data and being based on a first preamble; and upon determination that the terminal should use the second random access procedure, instruct the terminal to transmit a second random access request message in accordance with the second random access procedure for transmitting the data to the base station, the second random access request message being based on a second preamble.

Clause 40. The base station of clause 39 wherein the first preamble is selected from a first group of preambles and wherein and the second preamble is selected from a second group of preambles different from the first group of preambles.

Clause 41. The base station of clause 39 or 40 wherein the determination is based on at least one of:
the base station determining that the network is experiencing a high level of congestion, and
the base station determining that the at least part of the data in the first random access request message could not be decoded.

Clause 42. The base station of any of clauses 39 to 41 wherein instructing the terminal comprises responding to the first random access request message with a random access response message comprising an indicator, the indicator directing the terminal to use the second random access procedure.

Clause 43. A base station for receiving data in a telecommunications system comprising a terminal, the terminal being operable to use a first random access procedure and to use a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, the base station being configured to implement the method of any of clauses 35 to 38

Clause 44. Circuitry for a base station for receiving data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, wherein the circuitry comprises a controller element and a transceiver element configured to operate together to:

receive a first random access request message from a terminal in accordance with the first random access procedure for transmitting the data to the base station, the first random access request message comprising at least part of the data and being based on a first preamble; and upon determination that the terminal should use the second random access procedure, instruct the terminal to transmit a second random access request message in accordance with the second random access procedure for transmitting the data to the base station, the second random access request message being based on a second preamble.

Clause 45. Circuitry for a base station for receiving data in a telecommunications system comprising a base station, the terminal being operable to use a first random access procedure and a second random access procedure for the transmission of data to the base station, wherein, according to the first random access procedure, a terminal can initiate the procedure by transmitting a message comprising data and a random access preamble and, according to the second random access procedure, a terminal can only transmit data after receiving a response to an initiating message comprising a random access preamble, wherein the circuitry comprises a controller element and a transceiver element configured to operate together to implement the method of any of clauses 35 to 38.

REFERENCES

[1] Holma H. and Toskala A, "LTE for UMTS OFDMA and SC-FDMA based radio access", John Wiley and Sons, 2009
[2] RP-160671, "New SID Proposal: Study on New Radio Access Technology," NTT DOCOMO, RAN #71
[3] R1-1612062, "Control channel for slot format indicator," Qualcomm Incorporated, RAN1 #87

The invention claimed is:

1. A method of transmitting data in a telecommunications system comprising a terminal and a base station, the terminal configured to use a first random access procedure and a second random access procedure for the transmission of the data to the base station, wherein according to the first random access procedure, the terminal initiates the first random access procedure by transmitting a message comprising the data and a random access preamble, and according to the second random access procedure, the terminal only transmits the data after receiving a random access response, the method comprising:
    transmitting, by the terminal in a case that a size of the data is below a threshold, a first random access request message to the base station in accordance with the first random access procedure, the first random access request message comprising at least part of the data and a first preamble;
    determining, by the terminal, whether transmission of the first random access request message in accordance with the first random access procedure has been unsuccessful; and
    transmitting, by the terminal in a case that the determining indicates that the transmission in accordance the first random access procedure has been unsuccessful and in a case that the size of the data is above the threshold, a second random access request message to the base station in accordance with the second random access procedure, the second random access request message comprising a second preamble, wherein
    the terminal determines that the first random access procedure is unsuccessful in a case that the terminal receives an indicator from the base station, the indicator instructing the terminal to transmit in accordance with the second random access procedure.

2. The method of claim 1, wherein the first preamble is selected from a first group of preambles and the second preamble is selected from a second group of preambles different from the first group of preambles.

3. The method of claim 1, wherein the determining whether the first random access procedure has been unsuccessful is further based on the terminal failing to receive a response to the first random access request message within a time window.

4. The method of claim 1, further comprising:
    determining, by the base station, that the network is experiencing a high level of load; and
    responding, by the base station upon determining that the network is experiencing a high level of load, to the first random access request message with a random access response message comprising the indicator.

5. The method of claim 1, further comprising:
    determining, by the base station, that the at least part of the data in the first random access request message could not be decoded; and
    responding, by the base station upon determining that the at least part of the data could not be decoded, to the first random access request message with a random access response message comprising the indicator.

6. The method of claim 3, wherein
    the indicator comprises waiting time information, and
    the method further comprises, upon receipt of the indicator, the terminal waiting a certain time based before transmitting the second random access request message, the certain time based on the waiting time information.

7. The method of claim 1, further comprising:
    determining, by the terminal, to send the first random access request message in accordance with the first random access procedure when the size of the data is below the threshold; and
    determining, by the terminal, to use the second random access procedure when the size of the data is above the threshold.

8. The method of claim 1, further comprising:
    determining, by the terminal, that the first random access procedure has been unsuccessful when a number of unsuccessful transmission of random access messages to the base station in accordance with the first random access procedure has reached a predetermined number of attempts.

9. A terminal for transmitting data in a telecommunications system including a base station that is configured to receive transmissions via a first random access procedure and a second random access procedure, wherein according to the first random access procedure, the first random access procedure is initiated by transmission of a message comprising the data and a random access preamble, and according to the second random access procedure, transmission of the data is permitted only after reception of a random access response, the terminal comprising:
    a transceiver; and
    circuitry configured to
        control the transceiver to transmit, in a case that a size of the data is below a threshold, a first random access request message to the base station in accordance with the first random access procedure, the first random access request message comprising at least part of the data and a first preamble;
        determine whether transmission of the first random access request message in accordance with the first random access procedure has been unsuccessful; and
        control the transceiver to transmit, in a case that the circuitry determines that the transmission in accordance with the first random access procedure has been unsuccessful and in a case that the size of the data is above the threshold, a second random access request message to the base station in accordance with the second random access procedure, the second random access request message comprising a second preamble, wherein
    the circuitry determines that the first random access procedure is unsuccessful in a case that the transceiver receives an indicator from the base station, the indicator instructing the terminal to transmit in accordance with the second random access procedure.

10. The terminal of claim 9, wherein the first preamble is selected from a first group of preambles and the second preamble is selected from a second group of preambles different from the first group of preambles.

11. The terminal of claim 9, wherein the circuitry further determines whether the first random access procedure has been unsuccessful based on the terminal failing to receive a response to the first random access request message within a time window.

12. The terminal of claim 11, wherein
the indicator comprises waiting time information, and
the circuitry is further configured to, upon receipt of the indicator, wait a certain time based before controlling the transceiver to transmit the second random access request message, the certain time based on the waiting time information.

13. The terminal of claim 9, wherein the circuitry is further configured to
determine to control the transceiver to transmit the first random access request message in accordance with the first random access procedure when the size of the data is below the threshold, and
determine to use the second random access procedure when the size of the data is above the threshold.

14. The terminal of claim 9, wherein the circuitry is further configured to determine that the first random access procedure has been unsuccessful when a number of unsuccessful transmission of random access messages to the base station in accordance with the first random access procedure has reached a predetermined number.

15. Circuitry for a terminal that transmits data in a telecommunications system including a base station that is configured to receive transmissions via a first random access procedure and a second random access procedure, wherein according to the first random access procedure; the first random access procedure is initiated by transmission of a message comprising the data and a random access preamble, and according to the second random access procedure, transmission of the data is permitted only after reception of a random access response, the circuitry comprising:
a transceiver circuit; and
a control circuit configured to:
control the transceiver circuit to transmit, in a case that a size of the data is below a threshold, a first random access request message to the base station in accordance with the first random access procedure, the first random access request message comprising at least part of the data and a first preamble;
determine whether transmission of the first random access request message in accordance with the first random access procedure has been unsuccessful; and
control the transceiver circuit to transmit, in a case that the control circuit determines that the transmission in accordance with the first random access procedure has been unsuccessful and in a case that the size of the data is above the threshold, a second random access request message to the base station in accordance with the second random access procedure, the second random access request message comprising a second preamble, wherein
the control circuit determines that the first random access procedure is unsuccessful in a case that the transceiver circuit receives an indicator from the base station, the indicator instructing the terminal to transmit in accordance with the second random access procedure.

* * * * *